(12) United States Patent
Abdelaziz et al.

(10) Patent No.: US 12,400,108 B2
(45) Date of Patent: Aug. 26, 2025

(54) MIXED-PRECISION NEURAL NETWORK ACCELERATOR TILE WITH LATTICE FUSION

(71) Applicant: Samsung Electronics Co., Ltd., Suwon-si (KR)

(72) Inventors: Hamzah Ahmed Ali Abdelaziz, San Jose, CA (US); Ali Shafiee Ardestani, San Jose, CA (US); Joseph H. Hassoun, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1031 days.

(21) Appl. No.: 17/463,544

(22) Filed: Aug. 31, 2021

(65) Prior Publication Data

US 2022/0405559 A1 Dec. 22, 2022

Related U.S. Application Data

(60) Provisional application No. 63/212,104, filed on Jun. 17, 2021.

(51) Int. Cl.
 *G06N 3/063* (2023.01)
 *G06F 7/50* (2006.01)
 (Continued)

(52) U.S. Cl.
 CPC .............. *G06N 3/063* (2013.01); *G06F 7/50* (2013.01); *G06F 7/523* (2013.01); *G06F 7/5443* (2013.01); *G06F 9/5027* (2013.01)

(58) Field of Classification Search
 CPC ........... G06N 3/063; G06F 7/50; G06F 7/523; G06F 7/5443
 See application file for complete search history.

(56) References Cited

U.S. PATENT DOCUMENTS

| 4,958,312 A | 9/1990 | Ang et al. |
| 5,014,235 A | 5/1991 | Morton |

(Continued)

FOREIGN PATENT DOCUMENTS

| CN | 106909970 A | 6/2017 |
| CN | 110765413 A | 2/2020 |
| FR | 2661527 A1 | 10/1991 |

OTHER PUBLICATIONS

Sukhavasi, Susrutha Babu et al., "Design of High Throughput DCT Core Design by Efficient Computation Mechanism", International Journal of Modern Engineering Research (IJMER), vol. 2, Issue 4, Jul.-Aug. 2012, pp. 2922-2929.

(Continued)

*Primary Examiner* — Michael D. Yaary
(74) *Attorney, Agent, or Firm* — Renaissance IP Law Group LLP

(57) ABSTRACT

A neural network accelerator is disclosed that includes a multiplication unit, an adder-tree unit and an accumulator unit. The multiplication unit and the adder tree unit are configured to perform lattice-multiplication operations. The accumulator unit is coupled to an output of the adder tree to form dot-product values from the lattice-multiplication operations performed by the multiplication unit and the adder tree unit. The multiplication unit includes n multiplier units that perform lattice-multiplication-based operations and output product values. Each multiplier unit includes a plurality of multipliers. Each multiplier unit receives first and second multiplicands that each include a most significant nibble (MSN) and a least significant nibble (LSN). The multipliers in each multiplier unit receive different combinations of the MSNs and the LSNs of the multiplicands. The multiplication unit and the adder can provide mixed-precision dot-product computations.

18 Claims, 10 Drawing Sheets

(51) Int. Cl.
    *G06F 7/523*     (2006.01)
    *G06F 7/544*     (2006.01)
    *G06F 9/50*     (2006.01)

(56) References Cited

U.S. PATENT DOCUMENTS

| | | |
|---|---|---|
| 5,262,976 A | 11/1993 | Young et al. |
| 5,278,945 A | 1/1994 | Basehore et al. |
| 5,337,395 A | 8/1994 | Vassiliadis et al. |
| 5,509,106 A | 4/1996 | Pechanek et al. |
| 6,035,316 A | 3/2000 | Peleg et al. |
| 7,043,517 B2 | 5/2006 | Chung |
| 8,706,790 B1 | 4/2014 | Langhammer |
| 9,600,278 B1 | 3/2017 | Langhammer |
| 10,049,082 B2 | 8/2018 | Ling et al. |
| 11,568,227 B1 * | 1/2023 | Ko .......................... G06N 3/04 |
| 2014/0139365 A1 | 5/2014 | Vun et al. |
| 2020/0034699 A1 | 1/2020 | Jang et al. |
| 2020/0210187 A1 | 7/2020 | Alexander et al. |
| 2020/0349420 A1 | 11/2020 | Ovsiannikov et al. |
| 2021/0072986 A1 | 3/2021 | Yudanov et al. |

OTHER PUBLICATIONS

European Extended Search Report for Application No. 22167293.4, mailed Oct. 10, 2022.
Jang, Jun-Woo et al., "Sparsity-Aware and Re-Configurable NPU Architecture for Samsung Flagship Mobile SoC" 2021 ACM/IEEE 48th Annual International Symposium on Computer Architecture (ISCA), 2021, pp. 15-28.

\* cited by examiner

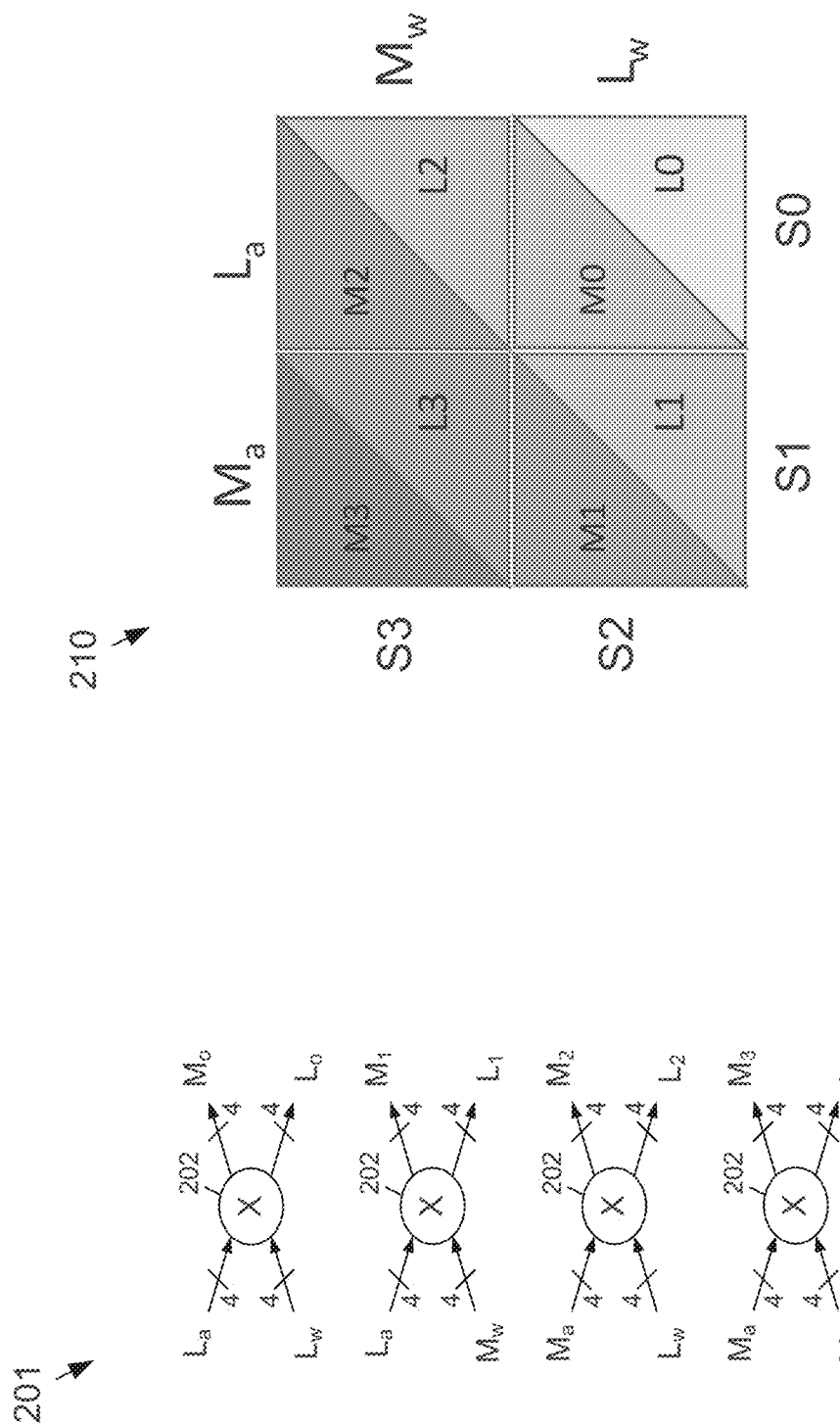

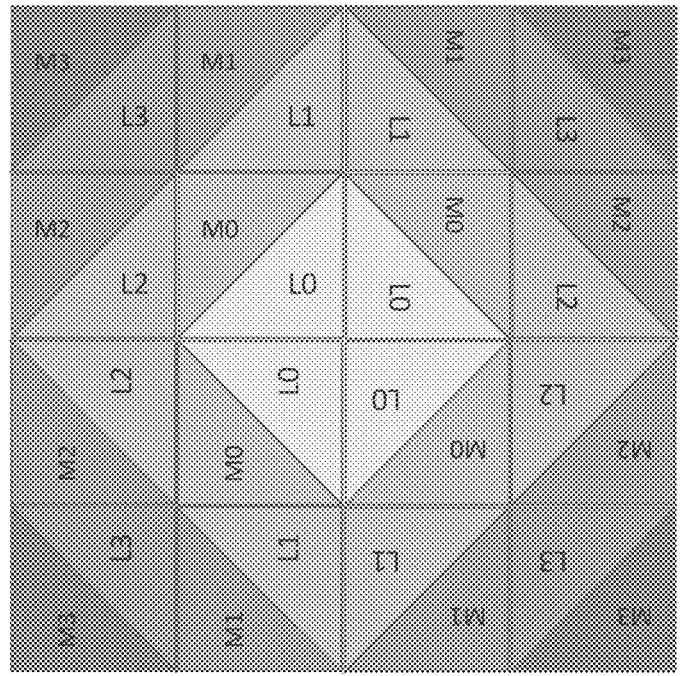
FIG. 5B
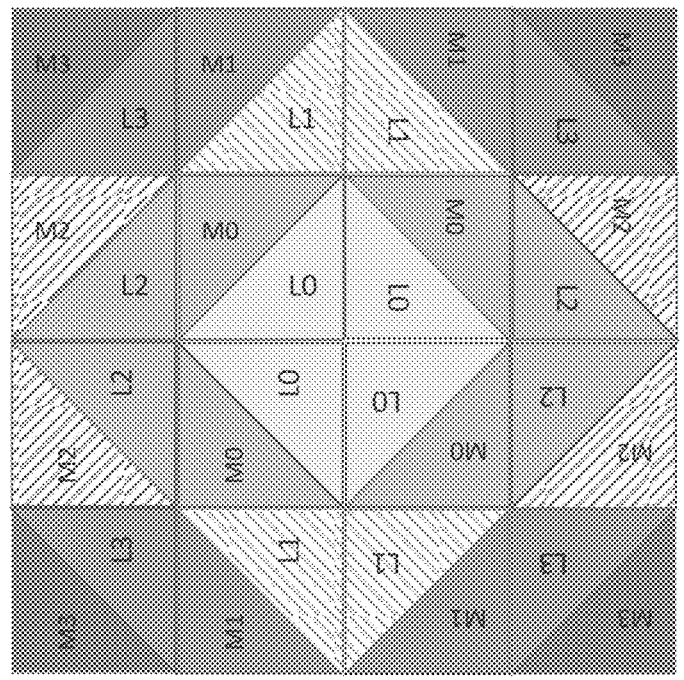
FIG. 5A

MIXED-PRECISION NEURAL NETWORK ACCELERATOR TILE WITH LATTICE FUSION

CROSS-REFERENCE TO RELATED APPLICATION

This application claims the priority benefit under 35 U.S.C. § 119(e) of U.S. Provisional Application No. 63/212,104, filed on Jun. 17, 2021, the disclosure of which is incorporated herein by reference in its entirety.

TECHNICAL FIELD

The subject matter disclosed herein relates to neural processing units (NPUs). More particularly, the subject matter disclosed herein relates to a neural network accelerator that utilizes lattice multiplication to form dot-product values.

BACKGROUND

NPUs are used to accelerate computation of deep-learning algorithms, such as a convolution neural network (CNN). NPUs may include dot-product compute units in which the output of an array of multiplications is input to an adder tree and then to accumulators to perform a dot-product operation. Different quantization techniques may be used to quantize weights and/or activations of deep learning algorithms. The quantization techniques may lead to different quantization precisions, such as an 8-bit precision or a 4-bit precision. Mixed-precision NPUs support accelerating different deep-learning algorithms having different precisions (e.g., number of bit per weight). Mixed-precision NPUs are typically built using a low-precision multiplication unit. Temporal or spatial fusion may be used in mixed-precision NPUs to support higher-precision computation. In spatial fusion, multiplication units (i.e., processing elements (PEs)) are divided into multiple sets or tiles. High-precision data may be divided into low-precision components (e.g., nibbles) and distributed to each set of multiplier according to the component location (e.g., most significant nibble (MSN), least significant nibbles (LSN)). Each set performs a partial computation of the high precision result using the low-precision multipliers. Results for each set may be combined (fused) together to generate a higher-precision calculation.

SUMMARY

An example embodiment provides a neural network accelerator that may include a multiplication unit, and adder tree unit and an accumulator unit. The multiplication unit and an adder tree unit may be configured to perform lattice-multiplication operations. The accumulator unit may be coupled to an output of the adder tree and may form dot-product values from the lattice-multiplication operations performed by the multiplication unit and the adder tree unit. In one embodiment, the multiplication unit may include n multiplier units that perform lattice-multiplication-based operations and output product values. In another embodiment, each multiplier unit may be an N×N multiplier unit, and each multiplier unit may include four N/2×N/2 multipliers. In one embodiment, n and N may be 8, and each multiplier unit may receive a first multiplicand and a second multiplicand in which the first multiplicand may include a most significant nibble and a least significant nibble and the second multiplicand may include a most significant nibble and a least significant nibble. Each multiplier unit may include a first multiplier that receives the least significant nibble of the first multiplicand and the least significant nibble of the second multiplicand, a second multiplier that receives the least significant nibble of the first multiplicand and the most significant nibble of the second multiplicand, a third multiplier that receives a most significant nibble of the first multiplicand and the least significant nibble of the second multiplicand, and a fourth multiplier that receives the most significant nibble of the first multiplicand and the most significant nibble of the second multiplicand. In one embodiment, the most significant nibble of the first multiplicand equals 0, and the most significant nibble of the second multiplicand may be greater than 0. In another embodiment, the most significant nibble of the first multiplicand may be greater than 0, and the most significant nibble of the second multiplicand equals 0. In still another embodiment, the first multiplier of each multiplier unit may output a least significant nibble L0 and a most significant nibble M0 of a first product value, the second multiplier of each multiplier unit may output a least significant nibble L1 and a most significant nibble M of a second product value, the third multiplier of each multiplier unit may output a least significant nibble L2 and a most significant nibble M2 of a third product value, and the fourth multiplier of each multiplier unit may output a least significant nibble L3 and a most significant nibble M3 of a fourth product value. In yet another embodiment, the adder tree may form a first sum S0 by adding all least significant nibbles of the first product values output by the n multiplier units, a second sum S1 by adding all least significant nibbles of the second product values, all least significant nibbles of the third product values and all most significant nibbles of the first product value output by the n multiplier units, a third sum S2 by adding all least significant nibbles of the fourth product values, all most significant nibbles of the second product values and all most significant nibbles of the third product values output by the n multiplier units, and a fourth sum S3 by adding all least most significant nibbles output by the n multiplier units. In one embodiment, the second sum S1 may further include a carry value from the first sum S0, the third sum S2 may further include a carry value from the second sum S1, and the fourth sum S3 may further include a carry value from the third sum S2.

An example embodiment provides a neural network accelerator that may include a multiplication unit, an adder tree and an accumulator unit. The multiplication unit may include n multiplier units that perform lattice-multiplication-based operations and output product values. The adder tree may be coupled to the multiplier unit to sum product values output from the multiplier unit and may output summed product values. The accumulator unit may form dot-product values by accumulating the summed product values. In one embodiment, each multiplier unit may be an N×N multiplier unit, and each multiplier unit may include four N/2×N/2 multipliers. In another embodiment, n and N may equal 8, and each multiplier unit may receive a first multiplicand and a second multiplicand in which the first multiplicand may include a most significant nibble and a least significant nibble and the second multiplicand may include a most significant nibble and a least significant nibble. Each multiplier unit may include a first multiplier that may receive the least significant nibble of the first multiplicand and the least significant nibble of the second multiplicand, a second multiplier that may receive the least significant nibble of the first multiplicand and the most significant nibble of the second multiplicand, a third multiplier that may receive a most significant nibble of the first multiplicand and the least significant nibble of the second multiplicand, and a fourth multiplier that may receive the most significant nibble of the first multiplicand and the most significant nibble of the second multiplicand. In another embodiment, the most significant nibble of the first multiplicand may equal 0, and the most significant nibble of the second multiplicand may be greater than 0. In still another embodiment, the most significant nibble of the first multiplicand may be greater than 0, and the most significant nibble of the second multiplicand may equal 0. In one embodiment, the first multiplier of each multiplier unit may output a least significant nibble L0 and a most significant nibble M0 of a first product value, the second multiplier of each multiplier unit may output a least significant nibble L1 and a most significant nibble M of a second product value, the third multiplier of each multiplier unit may output a least significant nibble L2 and a most significant nibble M2 of a third product value, and the fourth multiplier of each multiplier unit may output a least significant nibble L3 and a most significant nibble M3 of a fourth product value. In still another embodiment, the adder tree may form a first sum S0 by adding all least significant nibbles of the first product values output by the n multiplier units, a second sum S1 by adding all least significant nibbles of the second product values, all least significant nibbles of the third product values and all most significant nibbles of the first product value output by the n multiplier units, a third sum S2 by adding all least significant nibbles of the fourth product values, all most significant nibbles of the second product values and all most significant nibbles of the third product values output by the n multiplier units, and a fourth sum S3 by adding all least most significant nibbles output by the n multiplier units. In yet another embodiment, the second sum S1 may further include a carry value from the first sum S0, the third sum S2 may further include a carry value from the second sum S1, and the fourth sum S3 may further include a carry value from the third sum S2.

An example embodiment provides a mixed-precision neural network accelerator that may include a multiplication unit, an adder tree and an accumulator unit. The multiplication unit may include n multiplier units that perform lattice-multiplication-based operations and may output product values in which each multiplier unit may receive a first multiplicand and a second multiplicand. The first multiplicand may include a most significant nibble and a least significant nibble and the second multiplicand may include a most significant nibble and a least significant nibble. Each multiplier unit may include a first multiplier that receives the least significant nibble of the first multiplicand and the least significant nibble of the second multiplicand, a second multiplier that may receive the least significant nibble of the first multiplicand and the most significant nibble of the second multiplicand, a third multiplier that may receive a most significant nibble of the first multiplicand and the least significant nibble of the second multiplicand, and a fourth multiplier that may receive the most significant nibble of the first multiplicand and the most significant nibble of the second multiplicand. The adder tree may be coupled to the multiplier unit and may be configured to sum product values output from the multiplier unit and output summed product values. The accumulator unit may be configured to form dot-product values by accumulating the summed product values. In one embodiment, the first multiplier of each multiplier unit may output a least significant nibble L0 and a most significant nibble M0 of a first product value, the second multiplier of each multiplier unit may output a least significant nibble L1 and a most significant nibble M of a second product value, the third multiplier of each multiplier unit may output a least significant nibble L2 and a most significant nibble M2 of a third product value, and the fourth multiplier of each multiplier unit may output a least significant nibble L3 and a most significant nibble M3 of a fourth product value. The adder tree may forms a first sum S0 by adding all least significant nibbles of the first product values output by the n multiplier units, a second sum S1 by adding all least significant nibbles of the second product values, all least significant nibbles of the third product values and all most significant nibbles of the first product value output by the n multiplier units, a third sum S2 by adding all least significant nibbles of the fourth product values, all most significant nibbles of the second product values and all most significant nibbles of the third product values output by the n multiplier units, and a fourth sum S3 by adding all least most significant nibbles output by the n multiplier units. The second sum S1 may further include a carry value from the first sum S0, the third sum S2 may further include a carry value from the second sum S1, and the fourth sum S3 may further include a carry value from the third sum S2. In one embodiment, n and N may equal 8.

BRIEF DESCRIPTION OF THE DRAWING

In the following section, the aspects of the subject matter disclosed herein will be described with reference to exemplary embodiments illustrated in the figures, in which:

FIG. 2A depicts an example 8-bit×8-bit multiplier unit that may be used in the n multiplication unit 101 to perform a lattice-based multiplication operation according to the subject matter disclosed herein;

FIG. 2B depicts a lattice multiplication operation for the 8-bit values A and W according to the subject matter disclosed herein;

FIG. 5A depicts a lattice multiplication to generate a dot-product for two four-element vectors A and W in which vector A has 8-bit elements and vector W has 4-bit elements according to the subject matter disclosed herein;

FIG. 5B depicts the lattice multiplication of FIG. 3A to generate a dot-product for two four-element vectors A and W in which each vector has 8-bit elements according to the subject matter disclosed herein;

DETAILED DESCRIPTION

Figure 1:
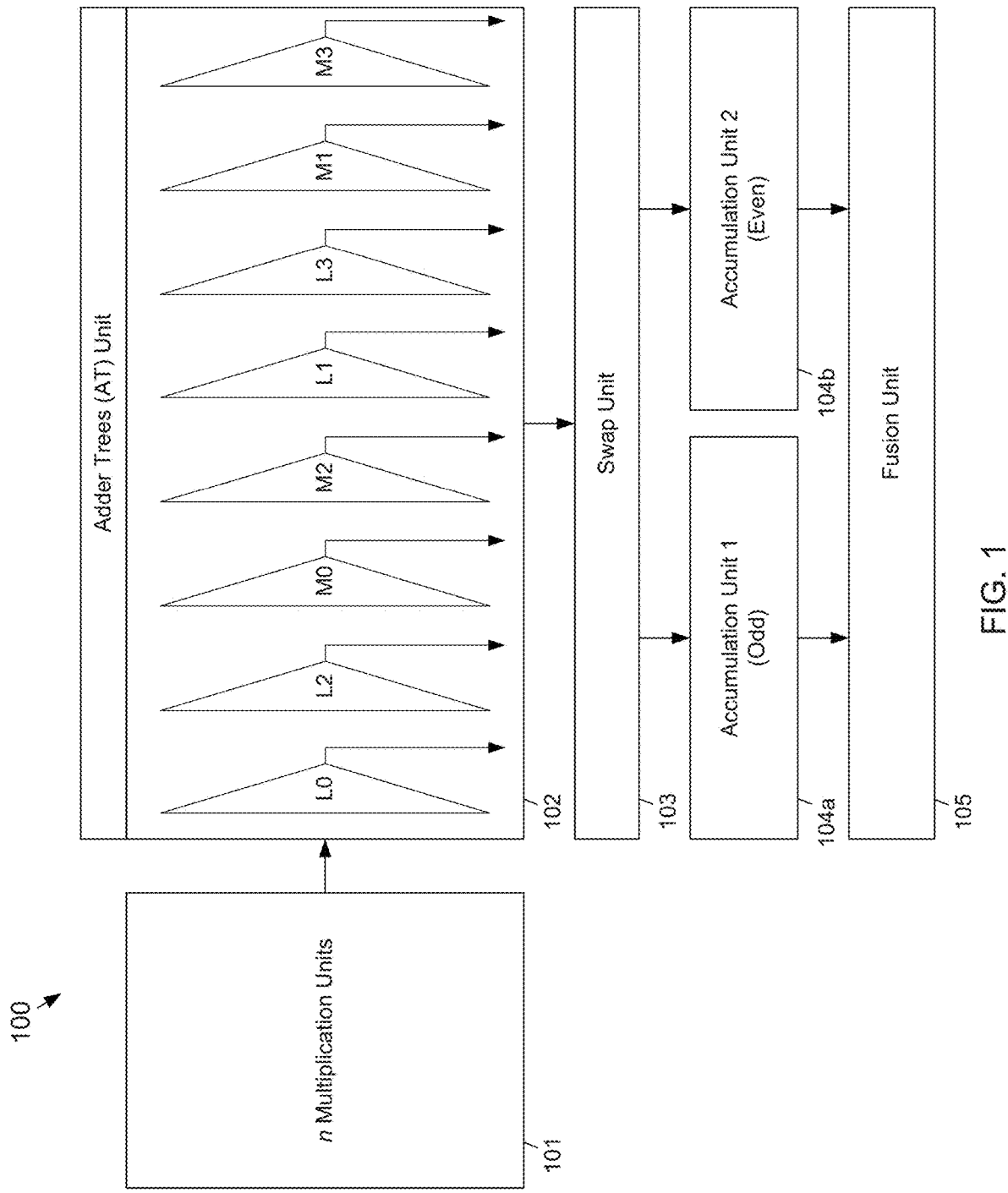
FIG. 1 depicts a block diagram of an example embodiment of a mixed-precision neural network accelerator tile having lattice fusion according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein provides a fusion mechanism for a dot-product unit. An output of a multiplier is divided into nibbles (4-bits) to perform a nibble-wise summation. The summation results are fused (combined) to obtain a final precision output. An optimized mixed-precision architecture is also disclosed herein that accelerates computation of deep-learning applications based on a dot-product compute unit. A mixed-precision feature may be obtained by nibble-wise summation of the low-precision multiplier output, then the summation results may be fused after the adder tree. A latency (i.e., speed) of the mixed-precision dot-product unit may be improved by first performing output nibble-wise summation, then fusing the summation results to obtain the final output.

The subject matter disclosed herein does not depend on (shift-add) comparing used with traditional multiplication, but utilizes a lattice-multiplication technique to minimize a critical path of a neural network accelerator and optimize circuit speed of the neural network accelerator. Additionally, mixed-precision dot-products are supported for different tile dimensions, e.g., INT8×INT4, INT8×INT8.

FIG. 1 depicts a block diagram of an example embodiment of a mixed-precision neural network accelerator tile 100 having lattice fusion according to the subject matter disclosed herein. The neural network accelerator 100 may be used to calculate dot-products. The neural network accelerator 100 may include an n multiplication unit 101, an adder trees unit 102, a swap unit 103, accumulation units 104a and 104b, and a fusion unit 105 arranged and connected as shown in FIG. 1. The different functional blocks depicted in FIG. 1 may be embodied as modules and/or circuits that may be any combination of software, firmware and/or hardware configured to provide the functionality described herein in connection a particular functional block.

The n multiplication unit 101 may include n 8-bit×8-bit multiplier units that are configured to generate product values based on lattice multiplication. The adder trees unit 102 may be configured to reduce the product values generated by the n multiplication unit 101. Together the multiplication unit 101 and the adder trees unit 102 operate based on a lattice multiplication technique. The swap unit 103 may be used to swap adder tree outputs based on the input precision of the multiplicands input to the multiplication unit 101. The accumulation units 104a and 104b may be configured to accumulate reduced product values that has been output from the adder trees 102. The fusion unit circuit 105 may be configured to fuse, or combine, lower precision values to form higher-precision values.

FIG. 2A depicts an example 8-bit×8-bit multiplier unit 201 that may be used in the n multiplication unit 101 to perform a lattice-based multiplication operation. The multiplier unit 201 may include four 4-bit×4-bit multipliers 202. Operation of the multiplier unit 201 may be illustrated by considering two unsigned 8-bit input values A and W that may be input to the multiplier unit 201. The 8 bits of A and W each form two hex digits $\{M_a, L_a\}$ and $\{M_w, L_w\}$ in which each hex digit is a nibble. $M_a$ is the Most Significant Nibble (MSN) of A, and $L_a$ is the Least Significant Nibble (LSN) of A. Similarly, $M_w$ is the MSN of W, and $L_w$ is the LSN of W.

FIG. 2B depicts a lattice multiplication operation 210 for the 8-bit values A and W. Product values output by the multipliers 202 located in diagonals having the same shade of gray are summed to complete the lattice multiplication operation. The multiplicands and products are labelled in both FIGS. 2A and 2B. The sum and carry for the lattice multiplication 210 of A and W are:

$$(C3, S3) = M3 + C2, \quad (1)$$

$$(C2, S2) = L3 + M1 + M2 + C1, \quad (2)$$

$$(C1, S1) = L1 + L2 + M0, \text{ and} \quad (3)$$

$$(C0, S0) = L0. \quad (4)$$

The final result R of the lattice multiplication 210 of A and W is R={C3, S3, S2, S1, S0}.

The multiplication unit 101 may be used for generating a mixed-precision dot-product using a lattice multiplication approach. For example, consider two vectors A and W that each have four vector elements in which each element has 8 bits. Vector A, vector W and the dot-product of vectors A and B may be defined as follows.

$$A = (a^0, a^1, a^2, a^3) \text{ in which } a^i = \{M_a^i, L_a^i\}, \quad (5)$$

$$W = (w^0, w^1, w^2, w^3) \text{ in which } w^i = \{M_w^i, L_w^i\}, \text{ and} \quad (6)$$

$$S = A \odot B = \Sigma_i a^i w^i, \quad (7)$$

in which i is an index for elements of the vectors A and W.

Figures 3A, 3B:
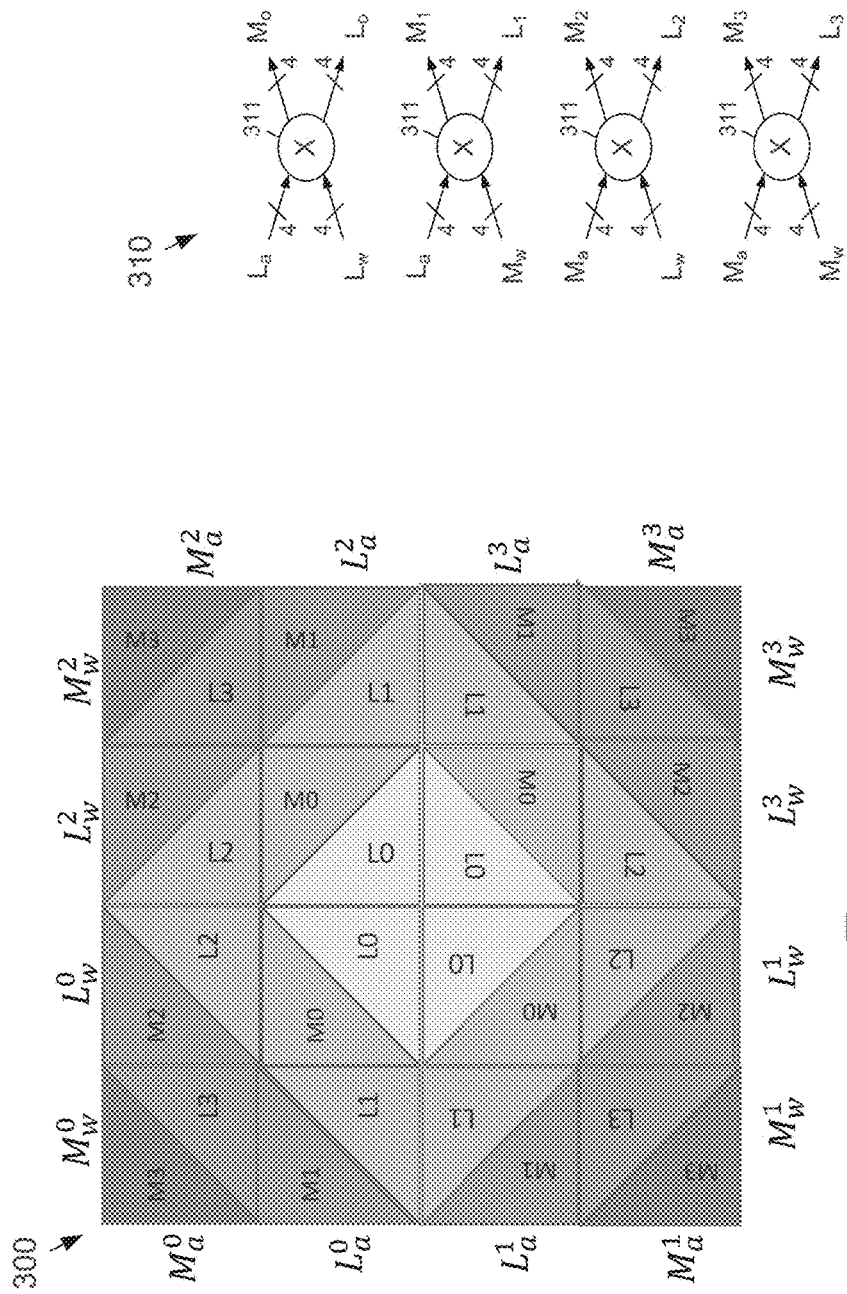
FIG. 3A depicts a lattice multiplication to generate product values and a dot-product value for two four-element vectors A and W in which each element has 8-bits according to the subject matter disclosed herein.
FIG. 3B depicts an example 8-bit×8-bit multiplier unit that may be used to generate the product values depicted in the lattice multiplication of FIG. 3A for the vectors A and W according to the subject matter disclosed herein.

FIG. 3A depicts a lattice multiplication 300 to generate product values and a dot-product value for two four-element vectors A and W in which each element has 8-bits. Product values along corresponding diagonals are summed. To generate a dot-product value, product values having the reference indicator L0 are summed; product values having the reference indicators L1, L2 and M0 are summed; product values having the reference indicators L3, M1 and M2 are summed; and product values having the reference indicator M3 are summed.

FIG. 3B depicts an example 8-bit×8-bit multiplier unit 310 that may be used to generate the product values depicted in the lattice multiplication 300 for the vectors A and W. The multiplier unit 310 may include four 4-bit×4-bit multipliers 311. A multiplier unit 310 may be used for each pair of correspondingly indexed elements of the vectors A and W. The multiplicands and products are labelled for both FIGS. 3A and 3B.

To obtain the dot-product sum of vectors A and W, product values along corresponding diagonals are summed as follows:

$$(C0, S0) = \Sigma_i L_0^i, \quad (8)$$

$$(C1, S1) = \Sigma_i (L_1^i + L_2^i M_0^i) + C0, \quad (9)$$

$$(C2, S2) = \Sigma_i (L_3^i + M_1^i + M_2^i) + C1, \text{ and} \quad (10)$$

$$(C3, S3) = \Sigma_i M_3^i + C2, \quad (11)$$

in which C0 is a carry bit for sum S0, C1 is a carry bit for sum S1, C2 is a carry bit for sum S2, and C3 is a carry bit for sum S3.

The final dot-product sum is S={C3, S3, S2, S1, S0}.

Table 1 sets forth bit positions in the final sum S for the different diamond-based summations in FIG. 3A. In Table 1, $d = \log_2(n)$ in which n is the number of elements in the dot product. For the example of FIGS. 3A and 3B, n=4.

TABLE 1

| Diamond Shape | Sum Bit Position (Indirect Shift) | Carry Bits (d ≤ 4) |
| --- | --- | --- |
| 301 | 0:3 | d |
| 302 | 4:7 | d + 2 |
| 303 | 8:11 | d + 2 |
| 304 | 12:15 + d + 1 | d + 1 |

Figure 4:
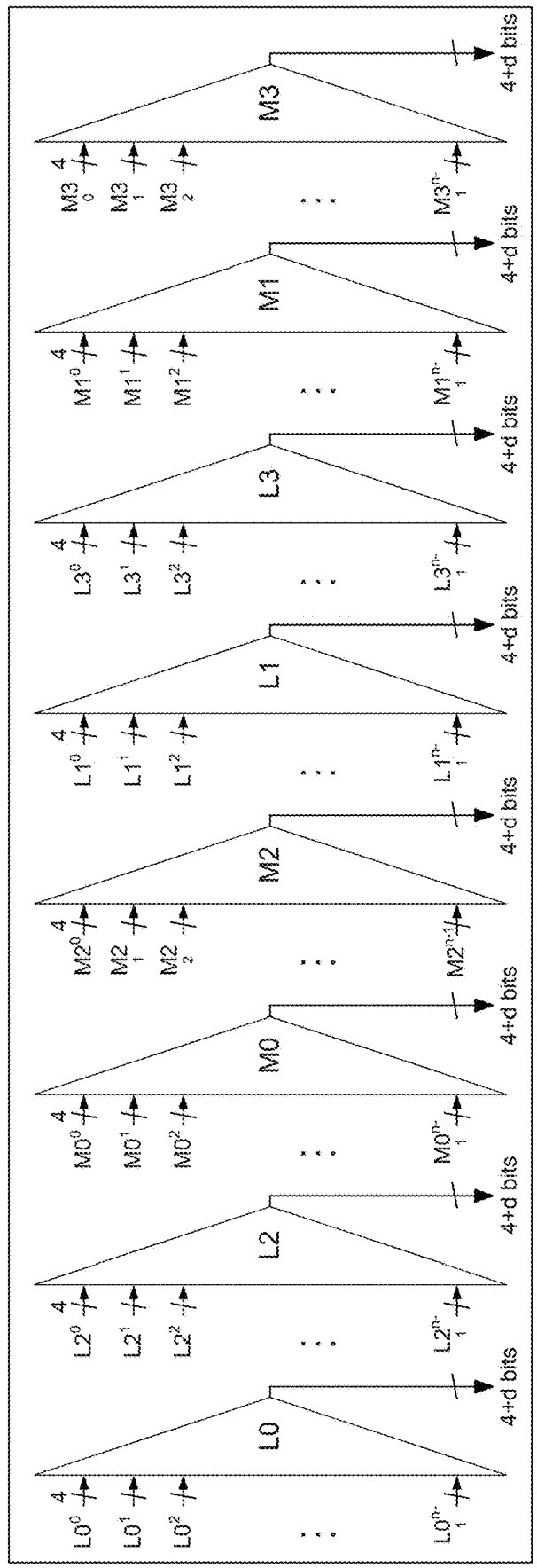
FIG. 4 shows an example embodiment of the adder trees unit according to the subject matter disclosed herein.

FIG. 4 shows an example embodiment of the adder trees unit 102 according to the subject matter disclosed herein. The multiplication unit 101 and the adder trees unit 102 may be configured as described herein to provide a lattice multiplication operation. The adder trees unit 102 may include adder trees $401_0$-$401_7$ that reduce the product values generated by the multipliers 311 to produce final sums of the lattice multiplications for a dot-product computation. Superscripts 0 through n−1 on the inputs of the adder trees represent corresponding outputs from the n multiplier units 310.

The multiplier units 101 may be used to provide a mixed-precision dot-product computation. Consider an example situation in which the input precision of each element a four element vector A is 8 bits, and the input precision of each element of a four element vector W is 4 bits. In such a situation, $M_w$ is actually a LSN. The final sum output for even indices i is:

$$(C0,S0)_0 = \Sigma_i L_0^i, \qquad (12)$$

$$(C1,S1)_0 = \Sigma E_i (L_2^i + M_0^i) + C0, \text{ and} \qquad (13)$$

$$(C2,S2)_0 = \Sigma_i M_2^i + C1. \qquad (14)$$

The final dot-product output for odd indices i is:

$$(C0,S0)_1 = \Sigma_i L_1^i, \qquad (15)$$

$$(C1,S1)_1 = \Sigma_i (L_3^i + M_1^i) + C0, \text{ and} \qquad (16)$$

$$(C2,S2)_1 = \Sigma_i M_3^i + C1. \qquad (17)$$

FIG. 5A depicts a lattice multiplication 500 to generate a dot-product for two four-element vectors A and W in which vector A has 8-bit elements and vector W has 4-bit elements. The equations defining the dot-product sum for even-indexed elements and odd-indexed elements are shown below FIG. 5A. For comparison to the lattice multiplication 500, FIG. 5B depicts the lattice multiplication 300 (FIG. 3A) to generate a dot-product for two four-element vectors A and W in which each vector has 8-bit elements. The changes in the summations of the lattice multiplication change as the precision of the two input vectors change between 8-bits×4-bits (FIG. 5A) and 8-bits×8-bits (FIG. 5B).

Figure 5C:
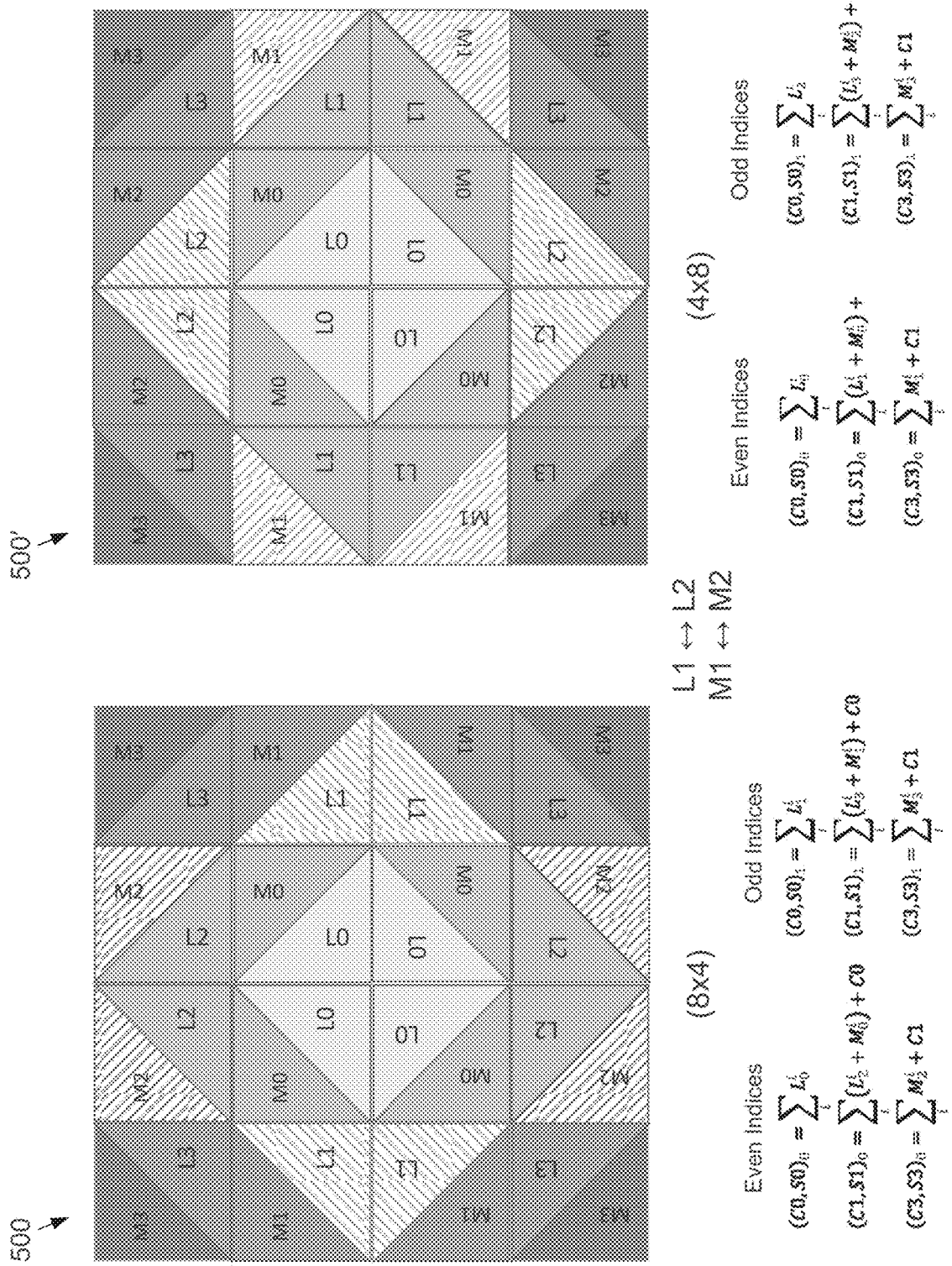
FIG. 5C shows how the dot-product summations change for a (8×4) input precision and for a (4×8) input precision according to the subject matter disclosed herein.

FIG. 5C shows how the dot-product summations change for a (8×4) input precision 500 and for a (4×8) input precision 500'. The summations change by L1 and L2 being swapped, and by M1 and M2 being swapped. The input swap unit 103 (FIG. 1) swaps L1 and L2 and swaps M1 and M2 depending upon the input precision.

Figure 6:
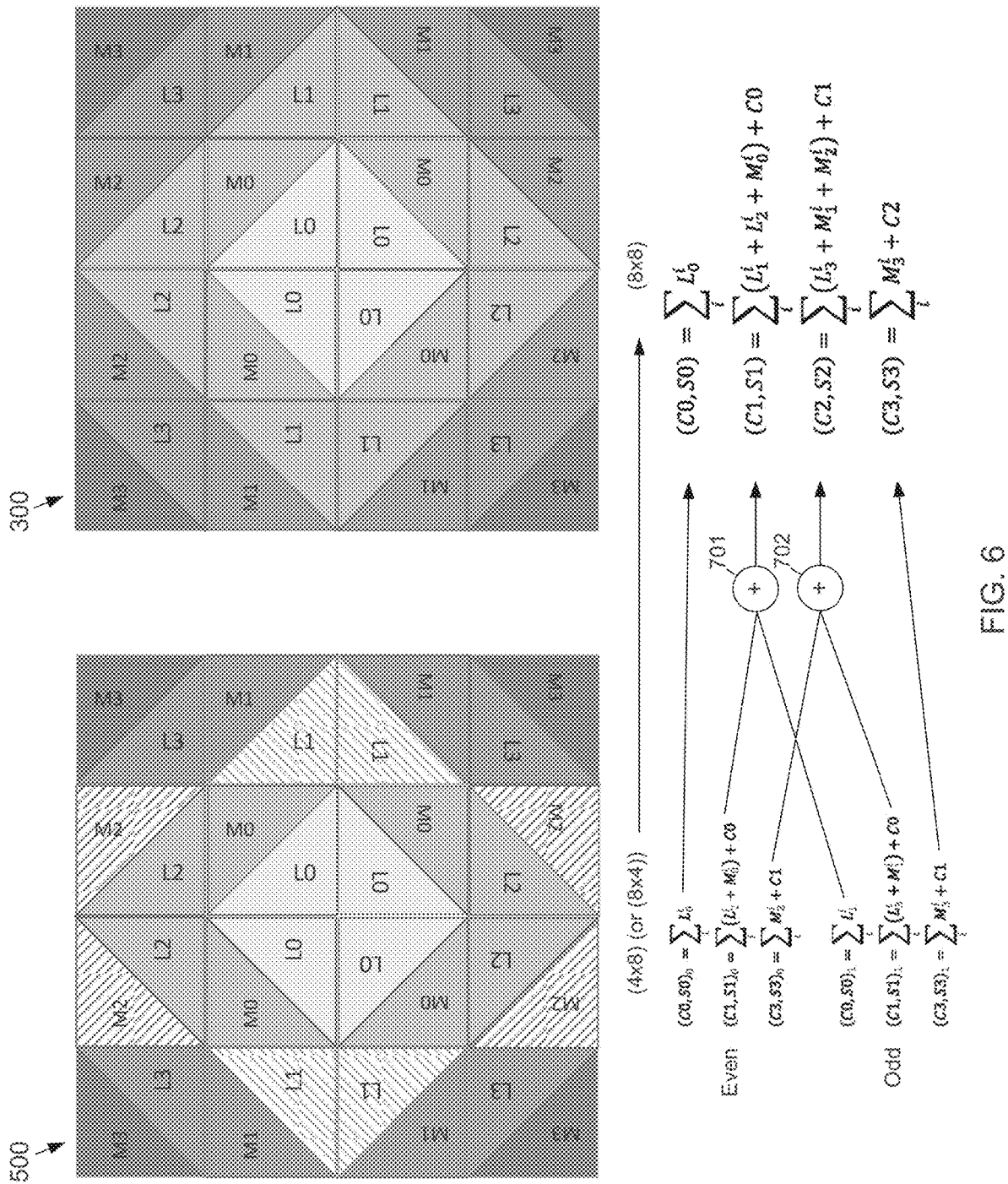
FIG. 6 depicts how the even indices and the odd indices summations for an input precision of 4×8 may be combined to form an 8×8 input precision according to the subject matter disclosed herein.

FIG. 6 depicts how the even indices and the odd indices summations for an input precision of 8×4 may be combined to form an 8×8 input precision. When the input precision is 4×8, the even and odd indices summations are nearly the same, except that L1 and L2, and M1 and M2 may be swapped depending upon the input precision. Toward the top of FIG. 6, a lattice multiplication 500 for (8×4) input precision and a lattice multiplication 300 for an (8×8) are depicted. Toward the bottom of FIG. 6, the summation equations for both (8×4) and (8×8) precisions are indicated. To turn a (4×8) and a (8×4) summation into an (8×8) summation, two adders 601 and 602 may be used. Adder 601 adds the $(C1, S1)_0$ and $(C0,S0)_1$ summations to form a (C1, S1) summation. Adder 602 adds the $(C3, S3)_0$ and the $(C1, S1)_1$ summations to form the (C2, S2) summation. The functionality depicted in FIG. 6 along with some additional control logic (not shown) may be part of an accumulation unit 104a (and/or 104b) (FIG. 1) to provide mixed-precision capability.

Figure 7:
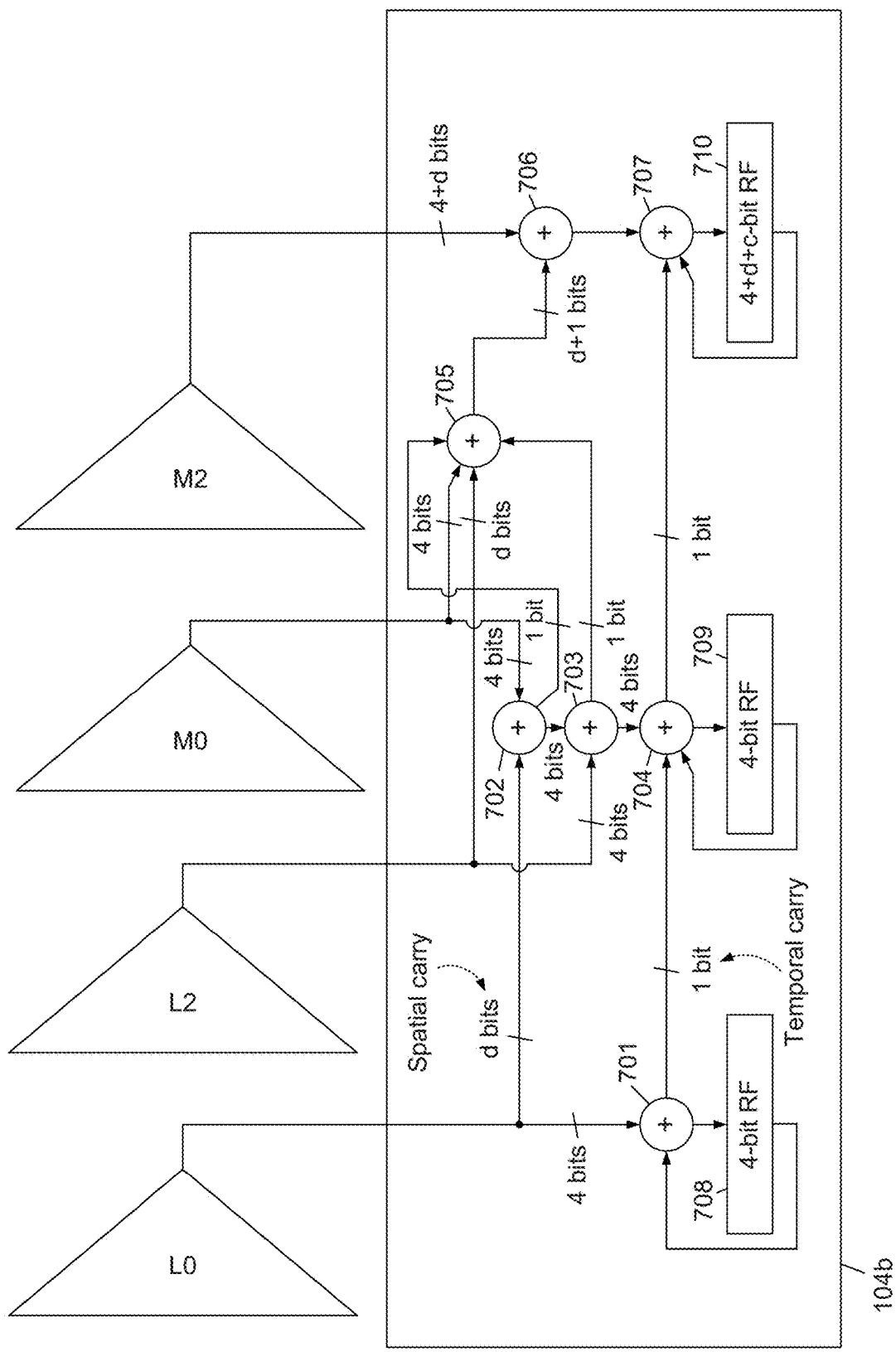
FIG. 7 depicts an block diagram for an example embodiment of an accumulation unit 2 (even) for d≤4 according to the subject matter disclosed herein.

FIG. 7 depicts a block diagram for an example embodiment of an accumulation unit 2 (even) 104b for d≤4 according to the subject matter disclosed herein. The accumulation unit 1 (odd) 104a is identical to the accumulation unit 2 (even) 104b except that the outputs that are shown as being received from the adder trees L0, L2, M0 and M2 are instead respectively received from the adder trees L1, L3, M1 and M3.

The accumulation unit 2 (even) 104b may include 4-bit adders 701-707, and 4-bit register files 708 and 709. Register file 710 is a 4+d+c bit register file. The register files 708-710 form the output of the accumulation unit 2 (even) 104b. The adder 701 receives a 4-bit output from the L0 adder tree and a 4-bit output from the register file 708. The adder 701 outputs a 4-bit sum to the register file 708 and outputs one temporal carry bit to the adder 704.

The adder 702 receives d spatial carry bits output from the L0 adder tree in which d =$\log_2$ (n) and n is the number of elements in the dot product. The adder 702 also receives 4-bit output from the M0 adder tree, and outputs a 4-bit sum to the adder 703 and a carry bit to the adder 705.

The adder 703 receives a 4-bit output from the L2 adder tree and the 4-bit output from the adder 703, and outputs a 4-bit sum to the adder 704. The adder 704 receives a 4-bit input from the register file 709, and outputs a 4-bit sum to the register file 709 and one carry bit to the adder 707.

The adder 705 receives the 4-bit output from the L2 adder tree and d bits from the adder tree M0. The adder 705 outputs d+1 bits to adder 706. The adder 706 receives 4+d bits output from the adder tree M2, and outputs a 4-bit sum to the adder 707. The adder 707 receives a 4+d+c-bit output from the register file 710 in which c is the maximum supported temporal iteration, e.g., c=$\log_2(1024\times 7\times 7)$. The adder 707 outputs a (4+d+c)-bit sum to the register file 710.

Figure 8:
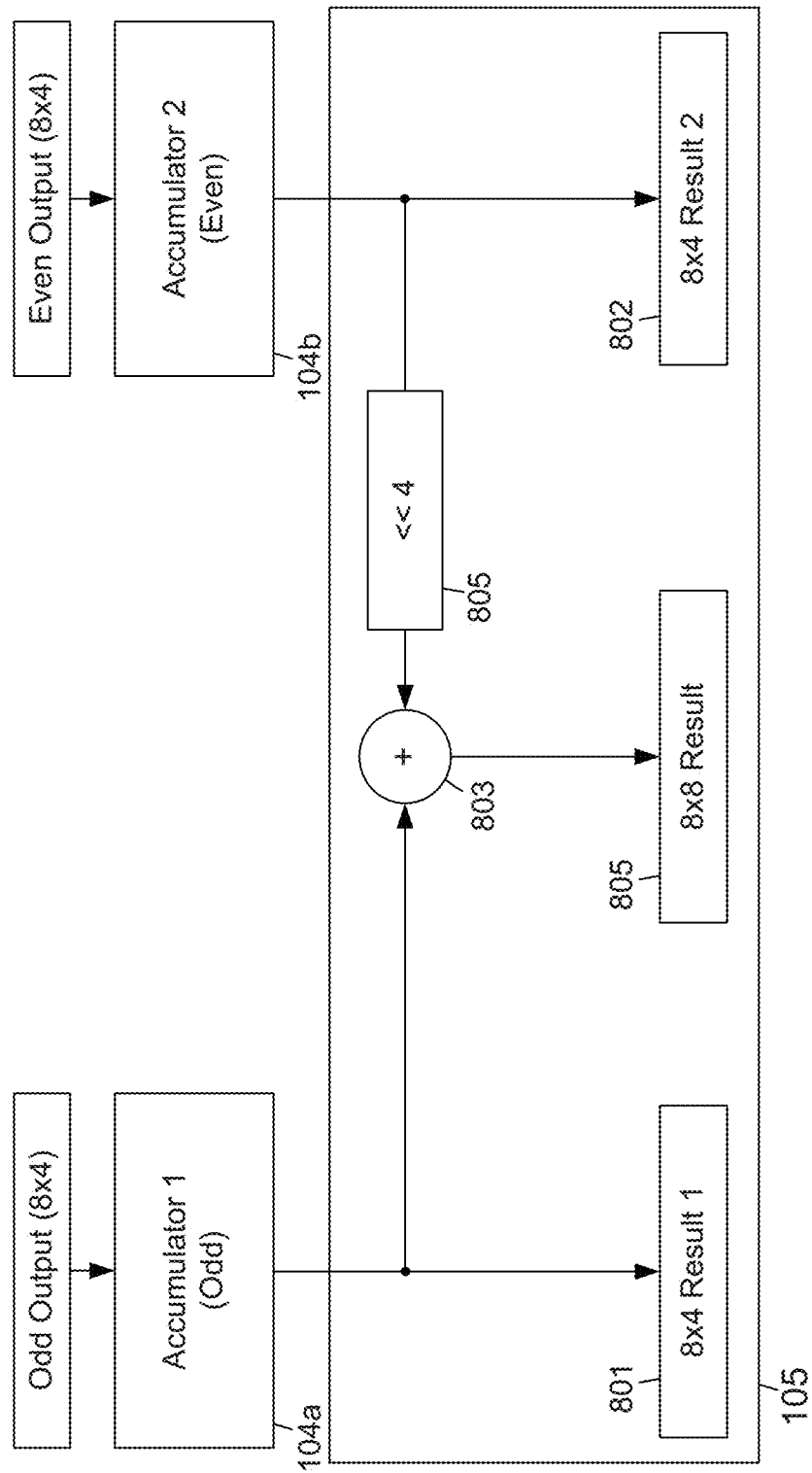
FIG. 8 depicts a block diagram for an example embodiment of a fusion unit according to the subject matter disclosed herein.

FIG. 8 depicts a block diagram for an example embodiment of a fusion unit 105 according to the subject matter disclosed herein. The fusion unit 105 may include an 8×4 Result 1 register 801, a 8×4 Result 2 register 802, an adder 803, a shifter 804, and an 8×8 Result register 805.

The register 801 receives the output from accumulator unit 1 (odd) 104a and the register 802 receives the output from accumulator unit 2 (even) 104b. To form an 8×8 result, the output from accumulator unit 1 (odd) 104a is input to the adder 803. The output of accumulator unit 2 (even) 104b is shifted left two (2) bits by shifter 804 and then input to the adder 803. The output of adder 803 is input to the register 805.

Figure 9:
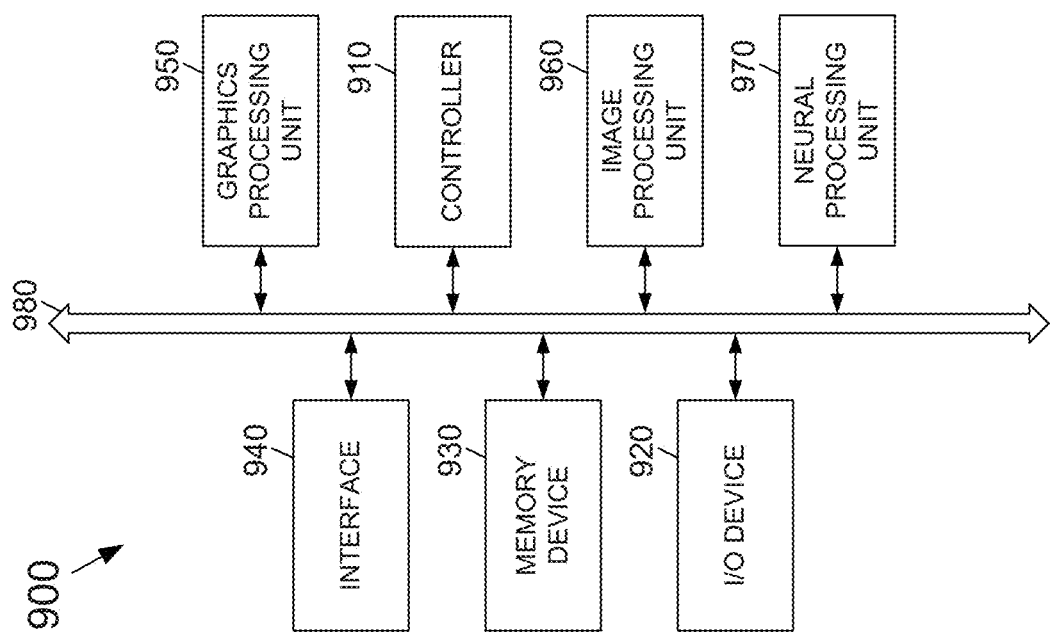
FIG. 9 depicts an electronic device that includes a neural processing unit includes a neural network accelerator according to the subject matter disclosed herein.

FIG. 9 depicts an electronic device 900 that includes a neural processing unit includes a neural network accelerator according to the subject matter disclosed herein. The electronic device 900 may include a controller (or CPU) 910, an input/output device 920 such as, but not limited to, a keypad, a keyboard, a display, a touch-screen display, a camera, and/or an image sensor, a memory 930, an interface 940, a GPU 950, an imaging-processing unit 960, and a neural processing unit 970 that are coupled to each other through a bus 980. The controller 910 may include, for example, at least one microprocessor, at least one digital signal processor, at least one microcontroller, or the like. The memory 930 may be configured to store a command code to be used by the controller 910 or a user data. Electronic device 900 and the various system components of electronic device 900 may be formed by one or more modules.

In one embodiment, the neural processing unit 970 may be configured to include a neural network accelerator according to the subject matter disclosed herein. The interface 940 may be configured to include a wireless interface that is configured to transmit data to or receive data from a wireless communication network using a RF signal. The wireless interface 940 may include, for example, an antenna. The electronic system 900 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A neural network accelerator, comprising:
    a multiplication unit and an adder tree unit configured to perform lattice-multiplication operations; and
    an accumulator unit coupled to an output of the adder tree to form dot-product values from the lattice-multiplication operations performed by the multiplication unit and the adder tree unit, wherein at least one multiplier unit of the multiplication unit comprises:
        a first multiplier that outputs a least significant nibble L0 and a most significant nibble M0 of a first product value,
        a second multiplier that outputs a least significant nibble L1 and a most significant nibble M1 of a second product value,
        a third multiplier that outputs a least significant nibble L2 and a most significant nibble M2 of a third product value, and
        a fourth multiplier that outputs a least significant nibble L3 and a most significant nibble M3 of a fourth product value.

2. The neural network accelerator of claim 1, wherein the multiplication unit comprises n multiplier units that perform lattice-multiplication-based operations and output product values.

3. The neural network accelerator of claim 2, wherein each multiplier unit comprises an N×N multiplier unit, and each multiplier unit comprises four N/2×N/2 multipliers.

4. The neural network accelerator of claim 3, wherein n and N comprise 8, and each multiplier unit receives a first multiplicand and a second multiplicand, the first multiplicand comprising a most significant nibble and a least significant nibble and the second multiplicand comprising a most significant nibble and a least significant nibble, and
    wherein each multiplier unit comprises a first multiplier that receives the least significant nibble of the first multiplicand and the least significant nibble of the second multiplicand, a second multiplier that receives the least significant nibble of the first multiplicand and the most significant nibble of the second multiplicand, a third multiplier that receives a most significant nibble of the first multiplicand and the least significant nibble of the second multiplicand, and a fourth multiplier that receives the most significant nibble of the first multiplicand and the most significant nibble of the second multiplicand.

5. The neural network accelerator of claim 4, wherein the most significant nibble of the first multiplicand comprises 0, and the most significant nibble of the second multiplicand is greater than 0.

6. The neural network accelerator of claim 4, wherein the most significant nibble of the first multiplicand is greater than 0, and the most significant nibble of the second multiplicand comprises 0.

7. The neural network accelerator of claim 4, wherein the adder tree forms a first sum S0 by adding all least significant nibbles of the first product values output by the n multiplier units, a second sum S1 by adding all least significant nibbles of the second product values, all least significant nibbles of the third product values and all most significant nibbles of the first product value output by the n multiplier units, a third sum S2 by adding all least significant nibbles of the fourth product values, all most significant nibbles of the second product values and all most significant nibbles of the third product values output by the n multiplier units, and a fourth sum S3 by adding all least most significant nibbles output by the n multiplier units.

8. The neural network accelerator of claim 7, wherein the second sum S1 further includes a carry value from the first sum S0, the third sum S2 further includes a carry value from the second sum S1, and the fourth sum S3 further includes a carry value from the third sum S2.

9. A neural network accelerator, comprising:
a multiplication unit comprising n multiplier units that perform lattice-multiplication-based operations and output product values;
an adder tree coupled to the multiplier unit and configured to sum product values output from the multiplier unit and output summed product values; and
an accumulator unit configured to form dot-product values by accumulating the summed product values, wherein at least one multiplier unit of the multiplication unit comprises:
a first multiplier that outputs a least significant nibble L0 and a most significant nibble M0 of a first product value,
a second multiplier that outputs a least significant nibble L1 and a most significant nibble M1 of a second product value,
a third multiplier that outputs a least significant nibble L2 and a most significant nibble M2 of a third product value, and
a fourth multiplier that outputs a least significant nibble L3 and a most significant nibble M3 of a fourth product value.

10. The neural network accelerator of claim 9, wherein each multiplier unit comprises an N×N multiplier unit, and each multiplier unit comprises four N/2×N/2 multipliers.

11. The neural network accelerator of claim 10, wherein n and N comprise 8, and each multiplier unit receives a first multiplicand and a second multiplicand, the first multiplicand comprising a most significant nibble and a least significant nibble and the second multiplicand comprising a most significant nibble and a least significant nibble, and
wherein each multiplier unit comprises a first multiplier that receives the least significant nibble of the first multiplicand and the least significant nibble of the second multiplicand, a second multiplier that receives the least significant nibble of the first multiplicand and the most significant nibble of the second multiplicand, a third multiplier that receives a most significant nibble of the first multiplicand and the least significant nibble of the second multiplicand, and a fourth multiplier that receives the most significant nibble of the first multiplicand and the most significant nibble of the second multiplicand.

12. The neural network accelerator of claim 11, wherein the most significant nibble of the first multiplicand comprises 0, and the most significant nibble of the second multiplicand is greater than 0.

13. The neural network accelerator of claim 11, wherein the most significant nibble of the first multiplicand is greater than 0, and the most significant nibble of the second multiplicand comprises 0.

14. The neural network accelerator of claim 11, wherein the adder tree forms a first sum S0 by adding all least significant nibbles of the first product values output by the n multiplier units, a second sum S1 by adding all least significant nibbles of the second product values, all least significant nibbles of the third product values and all most significant nibbles of the first product value output by the n multiplier units, a third sum S2 by adding all least significant nibbles of the fourth product values, all most significant nibbles of the second product values and all most significant nibbles of the third product values output by the n multiplier units, and a fourth sum S3 by adding all least most significant nibbles output by the n multiplier units.

15. The neural network accelerator of claim 14, wherein the second sum S1 further includes a carry value from the first sum S0, the third sum S2 further includes a carry value from the second sum S1, and the fourth sum S3 further includes a carry value from the third sum S2.

16. A mixed-precision neural network accelerator, comprising:
a multiplication unit comprising n multiplier units that perform lattice-multiplication-based operations and output product values, each multiplier unit receiving a first multiplicand and a second multiplicand, the first multiplicand comprising a most significant nibble and a least significant nibble and the second multiplicand comprising a most significant nibble and a least significant nibble, each multiplier unit comprises a first multiplier that receives the least significant nibble of the first multiplicand and the least significant nibble of the second multiplicand, a second multiplier that receives the least significant nibble of the first multiplicand and the most significant nibble of the second multiplicand, a third multiplier that receives a most significant nibble of the first multiplicand and the least significant nibble of the second multiplicand, and a fourth multiplier that receives the most significant nibble of the first multiplicand and the most significant nibble of the second multiplicand;
an adder tree coupled to the multiplier unit and is configured to sum product values output from the multiplier unit and output summed product values; and
an accumulator unit configured to form dot-product values by accumulating the summed product values, wherein at least one multiplier unit of the multiplication unit comprises:
a first multiplier that outputs a least significant nibble L0 and a most significant nibble M0 of a first product value,
a second multiplier that outputs a least significant nibble L1 and a most significant nibble M1 of a second product value,
a third multiplier that outputs a least significant nibble L2 and a most significant nibble M2 of a third product value, and a fourth multiplier that outputs a least significant nibble L3 and a most significant nibble M3 of a fourth product value.

17. The mixed-precision neural network accelerator of claim 16,
wherein the adder tree forms a first sum S0 by adding all least significant nibbles of the first product values output by the n multiplier units, a second sum S1 by adding all least significant nibbles of the second product values, all least significant nibbles of the third product values and all most significant nibbles of the first product value output by the n multiplier units, a third sum S2 by adding all least significant nibbles of the fourth product values, all most significant nibbles of the second product values and all most significant nibbles of the third product values output by the n multiplier units, and a fourth sum S3 by adding all least most significant nibbles output by the n multiplier units, and
wherein the second sum S1 further includes a carry value from the first sum S0, the third sum S2 further includes a carry value from the second sum S1, and the fourth sum S3 further includes a carry value from the third sum S2.

18. The mixed-precision neural network accelerator of claim 17, wherein n and N comprise 8.

* * * * *